Patented Apr. 15, 1947

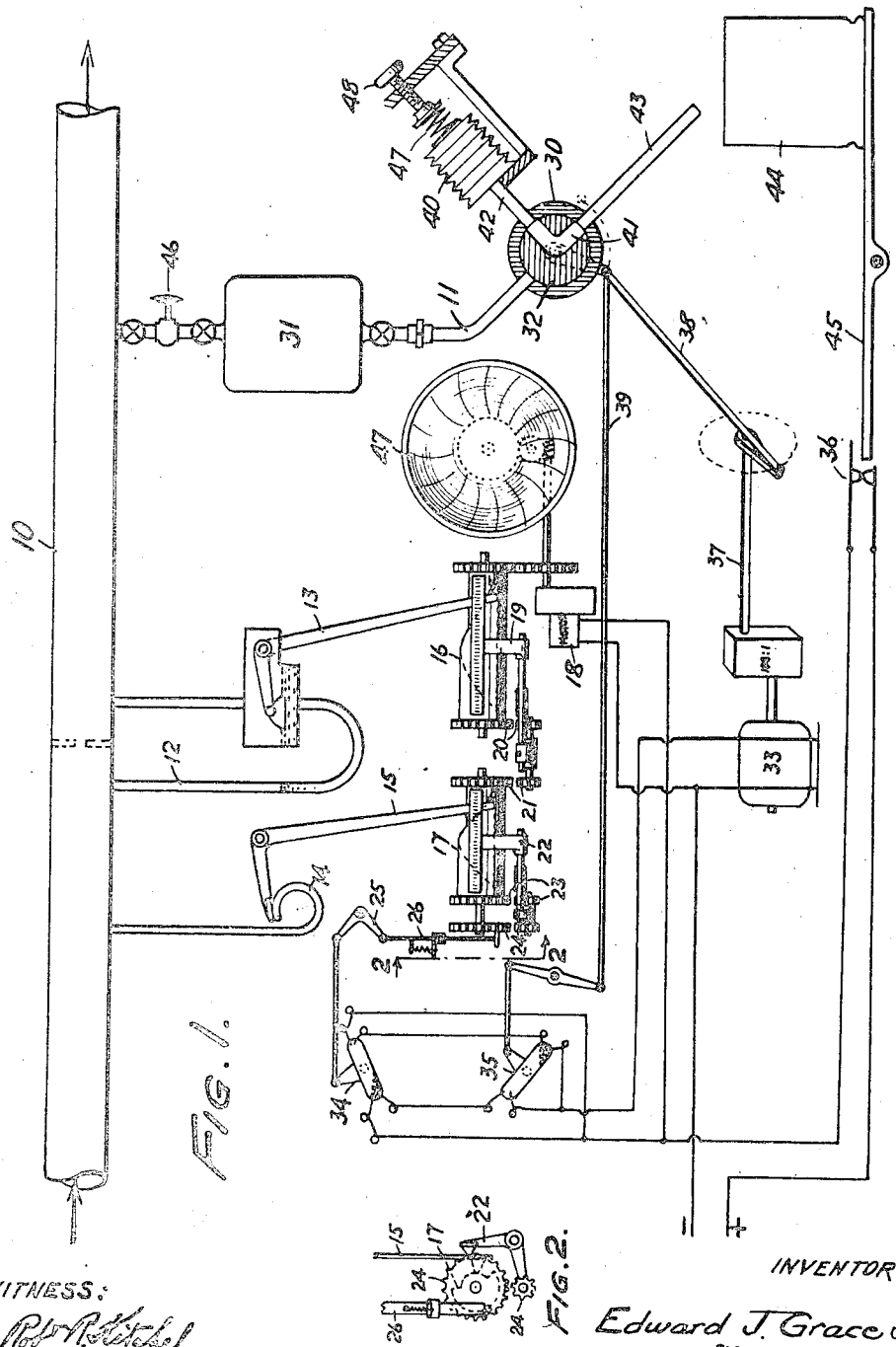

2,418,876

UNITED STATES PATENT OFFICE 2,418,876

APPARATUS FOR COLLECTING FLUID SAMPLES

Edward J. Grace, Jr., Swarthmore, Pa., assignor to Sun Oil Company, Philadelphia, Pa., a corporation of New Jersey Application October 6, 1944, Serial No. 557,497

5 Claims. (Cl. 73—422)

1

The present invention relates to an apparatus or system for collecting fluids in either liquid or gaseous phase for the purpose of subsequently analyzing the collected samples.

The commercial production of many gases and liquids varies in accordance with operating conditions and at one period they may be manufactured at a comparatively rapid rate and at another period at a much slower rate. Likewise the quality of the fluids produced will vary greatly during different periods of their manufacture. It will be appreciated therefore, that a sample of a gas or liquid taken at one step or stage of its manufacture would not be truly representative of either the quantity or quality throughout the entire period of production or flow of such gas or liquid, from the source at which it is being manufactured. At one period of its manufacture it may be very rich, at another period very lean; at another period or step, its rate of manufacture may be very fast, and at another step of its manufacture very slow.

By my invention I can obtain a sample which will show the true quality of the product being manufactured since the volume of the sample obtained will have a direct relation to the total volume of fluid passed through the line during the sampling period. This relation will be maintained regardless of varying flow conditions of fluid through the line.

An object of the present invention is to provide for the collection of a representative sample of fluid flowing through a line over a period of time.

A further object of the present invention is to provide a device or system for collecting a sample in accordance with the volume of fluid passed through a line.

Other objects of the invention will become apparent as the description proceeds.

In the drawings:

Fig. 1 is generally a diagrammatic elevational view with some parts sectioned to show details.

Fig. 2 is a view on the line 2—2 of Fig. 1.

Referring to Fig. 1, 10 represents the main conduit through which the liquid or gaseous medium flows and adjacent the right end of the conduit is the branch line 11 through which the sample fluid is collected. Adjacent the opposite end of the conduit 10 portions of a conventional flow recorder of the pressure compensated integrator type are shown. These comprise a manometer 12 which actuates differential pressure arm 13 in accordance with the differential pressure across an orifice plate in the conduit and a Bourdon tube 14 which actuates static pressure arm 15 in accordance with the static pressure existing in the conduit. Identical drums 16 and 17 cooperate with arms 13 and 15 respectively and each is provided with a cylindrical raised surface which increases in width from right to left in proportion to the reading on a square root scale shown positioned in front of each drum. Drum 16 is driven by motor 18 to make one rotation during a set period, for example, each minute, and throughout the interval in which the differential arm 13 rides on the raised surface of drum 16 the rocker lever 19 on which the scale is mounted will be forced outwardly by the differential arm 13 to effect an engagement of the gears in gear trains 20 and 21 causing rotation of static pressure drum 17. The degree that the static pressure drum 17 is rotated by a full revolution of the differential pressure drum 16 will depend on the width of the raised surface at the point where the differential pressure arm 13 momentarily rests. Similarly, throughout the interval in which the static pressure arm 15 rides the raised surface of the static pressure drum 17, its rocker lever 22 will effect an engagement of the gears in gear trains 23 and 24 (as will be seen from Fig. 2) to raise rocker arm 25 through linkage 26.

The branch line 11 through which the sample fluid is collected is provided with valve means generally indicated at 30 which is arranged to remove fluid from conduit 10 in response to the movement of the control rocker arm 25 for collection in vessel 31. The valve means may conveniently take the form of a three-way valve plug indicated at 32, the movement of which is controlled, for example, through a constant speed motor 33, a series of switches 34, 35, 36, motor shaft 37, and connecting rods 38 and 39, to periodically place the valve in communication with the collecting vessel 31 and a cooperating measuring vessel 40.

In operation, the rocker arm 25 is actuated in accordance with the volume of fluid which has passed through conduit 10 by means of drum 17 of the flow meter and the mercury switch 34 will be tilted to the right from the position shown and remain in this position until the linkage 26 drops to reverse the movement of arm 25 and again open switch 34. Thus the circuit to motor 33 is closed through mercury switch 35 until switch 34 is opened. The passageway 41 in valve plug 32 will be assumed to be in the position shown in Fig. 1 at the beginning of the sample collecting operation and upon energization of motor 33 its shaft 37 will make one-half revolution and through connecting rod 38 will rock the valve plug 90° until its passageway 41 is in communication with branch line 11 and line 42 to place collecting vessel 31 and measuring vessel 40 in communication until the valve plug 32 is again moved under the actuation of rocker arm 25. When the valve plug 32 has been rotated 90°, mercury switch 35 will be tilted, from its shown position, to the left through rod 39 breaking the circuit to motor 33 and the movement of valve plug 32 will be stopped. The valve will remain in this position until it is again actuated in accordance with the volume of the fluid passed through line 10. The valve 32 will be actuated at variable time intervals which are determined by successive equal volumes of fluid passed through line 10 and it is obvious that the motor actuating valve 32 will at all of its energizations effect the actuation to transmit and discharge the displacement liquid within equal time intervals.

In order to adapt the apparatus for the collection of gas, vapor, or liquid, the vessel 31 will first be filled with a displacement liquid such as ethylene-glycol and as long as vessels 31 and 40 are in communication a portion of the displacement liquid in vessel 31 will be transferred to vessel 40 and the sample fluid from conduit 10 will be collected in vessel 31 in a volume equal to the liquid displaced. When the valve plug 32 is again moved in accordance with the volume of the fluid passed through conduit 10, the passageway 41 will be placed in communication with line 42 and disposal line 43 and the displaced liquid which had entered vessel 40 will be discharged into a suitable container 44. The operation of the apparatus will continue until all the displacement liquid is removed from the vessel 31 and it is completely filled with the sample medium from conduit 10 at which time the vessel 44 will contain the displacement liquid which was originally in collection vessel 31. At this point in the operation, the vessel 44 is arranged to stop the operation of the collecting apparatus and to this end switch 36 will be moved from its shown closed position through arm 45 under the weight of the liquid in container 44 and the circuit to motor 33 will be broken. In order to prevent escape of collected gas or vapor back into main conduit 10 a pressure reducing valve 46 is positioned between the line 10 and the collecting vessel 31 which will be set to hold a constant pressure lower than any pressure in the main line.

When the control arm 25 is actuated in accordance with the volume of the fluid passed through the conduit 10 the switch 34 will be actuated to closed position and will remain in this position for a length of time depending upon the volume of the fluid passed through conduit 10. Hence passageway 41 of valve 32 will place collecting vessel 31 and measuring vessel 40 in communication for the length of time during which the switch 35 remains closed. The vessel 40 is designed to receive only a measured amount of displacement liquid from vessel 31 regardless of the length of time that the vessels are in communication. The relative size of the measuring vessel 40 to that of the collecting vessel 31 will depend on the volume of sample it is desired to collect over any definite period. For example, if it is desired to collect a gallon of sample fluid in vessel 31 over a twenty-four hour period, vessel 40 would be designed to receive only a fractional portion of liquid from vessel 31 each time that the valve 32 places the vessels in communication. Since the pressure in line 10 may vary over any period of operation the volume of vessel 40 will be based on an anticipated or estimated volume to be passed through line 10 in order that the liquid originally in vessel 31 will be entirely removed therefrom and replaced by the sample fluid from line 10. In practical operation of the collecting apparatus the vessel 31 will probably be completely emptied of the displacement liquid before the selected period of time has elapsed for collecting the sample and to overcome this practical difficulty in utilizing the invention a chart 47 is controlled by the operation of motor 18 and consequently, when the vessel 31 is filled with the collected sample and the displacement liquid originally in vessel 31 has been transferred to container 44 and the emergency switch 36 has been open to stop operation of motor 33, the movement of the chart 49 will likewise be stopped and from the chart the actual period for the collection of fluid in vessel 31 can be noted therefrom.

In order to readily adapt the vessel 40 for varying volumes of fluid passed through line 10 the vessel will take the form of a hydron or bellows arrangement so that the volume of the vessel may be varied expeditiously through the spring 47 and adjusting screw 48. Through this adjusting means the volume of vessel 40 when it is in expanded condition can be set to receive a volume of liquid from vessel 31 estimated on the expected average rate of flow through line 10 and when it has received this volume of fluid it will be retained therein until the valve 32 is again actuated to place the vessel in communication with the container 44 and through the force exerted by spring 47 the hydron or bellows will be collapsed to expel the fluid trapped therein.

While certain novel features of the invention have been shown and described it will be understood that the invention contemplates various changes in illustrated device and is to be limited only by the scope of the appended claims.

I claim:

1. Apparatus for obtaining an average sample from a stream of fluid flowing through a conduit which comprises a branch line in communication with the conduit, a collecting vessel in said branch line containing a displacement liquid, valve means for removing the displacement liquid from said vessel to permit the sample fluid to be collected therein, a measuring vessel for receiving predetermined volumes of liquid from said collecting vessel, a flow meter operated in accordance with the volume of fluid passed through said conduit, switch means controlled by said flow meter for actuating said valve to transmit a predetermined volume of displacement liquid to the measuring vessel, said flow meter being operative to discharge each volume of liquid from the measuring vessel to a reservoir, and means operative when the reservoir has received the volume of liquid originally in the collecting vessel for stopping the sample collecting operation.

2. Apparatus for obtaining an average sample from a stream of fluid flowing through a conduit which comprises a branch line in communication with the conduit, a collecting vessel in said branch line containing a displacement liquid, valve means for removing the displacement liquid from said vessel to permit the sample fluid to be collected therein, a measuring vessel for receiving predetermined volumes of liquid from said collecting vessel, means operative at variable time intervals determined by successive equal volumes of fluid passed through said conduit for actuating said valve means to transmit the predetermined volume of displacement liquid to the measuring vessel and to discharge each volume of liquid from the measuring vessel.

3. Apparatus for obtaining an average sample from a stream of fluid flowing through a conduit which comprises a branch line in communication with the conduit, a collecting vessel in said branch line containing a displacement liquid, valve means for removing the displacement liquid from said vessel to permit the sample fluid to be collected therein, a bellows type measuring vessel of adjustable capacity for receiving predetermined volumes of liquid from said collecting vessel, means operative at variable time intervals determined by successive equal volumes of fluid passed through said conduit for actuating said valve means to transmit the predetermined volume of displacement liquid to the measuring vessel and to discharge each volume of liquid from the measuring vessel.

4. Apparatus for obtaining an average sample from a stream of fluid flowing through a conduit which comprises a branch line in communication with the conduit, a collecting vessel in said branch line containing a displacement liquid, valve means for removing the displacement liquid from said vessel to permit the sample fluid to be collected therein, a collapsible measuring vessel for receiving predetermined volumes of liquid from said collecting vessel, flow controlled means operative at variable time intervals determined by successive equal volumes of fluid passed through said conduit for actuating said valve means to transmit the predetermined volume of displacement liquid to the measuring vessel and to discharge each volume of liquid from the measuring vessel, and means for adjusting the capacity of the collapsible measuring vessel.

5. Apparatus for obtaining an average sample from a stream of fluid flowing through a conduit which comprises a branch line in communication with the conduit, a collecting vessel in said branch line containing a displacement liquid, valve means for removing the displacement liquid from said vessel to permit the sample fluid to be collected therein, a measuring vessel for receiving predetermined volumes of liquid from said collecting vessel, means operative at variable time intervals determined by successive equal volumes of fluid passed through said conduit for actuating said valve means to transmit the predetermined volume of displacement liquid to the measuring vessel and to discharge each volume of liquid from the measuring vessel, said valve-actuating means including a motor adapted, at each actuation of the valve means, to effect its liquid transmitting and discharging operation within the same time interval.

EDWARD J. GRACE, Jr.

REFERENCES CITED

The following references are of record in the file of this patent:

UNITED STATES PATENTS

| Number | Name | Date |
| --- | --- | --- |
| 2,122,991 | Polston | July 5, 1938 |
| 2,245,679 | Kelly | June 17, 1941 |
| 2,225,798 | Price | Dec. 24, 1940 |
| 1,837,858 | Grace | Dec. 22, 1931 |